(12) United States Patent
Elich

(10) Patent No.: US 6,497,111 B2
(45) Date of Patent: Dec. 24, 2002

(54) METHOD AND DEVICE FOR EVAPORATING A LIQUID AND CYLINDRICAL DRUM FOR USE IN THE DEVICE

(75) Inventor: Jacobus Johannes Elich, Papendrecht (NL)

(73) Assignee: The Waterpower Trust N.V., Sta. Cruz (AW)

( * ) Notice: Subject to any disclaimer, the term of this patent is extended or adjusted under 35 U.S.C. 154(b) by 0 days.

(21) Appl. No.: 09/993,428

(22) Filed: Nov. 27, 2001

(65) Prior Publication Data

US 2002/0056285 A1 May 16, 2002

Related U.S. Application Data

(63) Continuation of application No. PCT/NL00/00361, filed on May 25, 2000.

(30) Foreign Application Priority Data

May 27, 1999 (NL) .............................................. 1012173

(51) Int. Cl.[7] ............................... F28D 5/00; F24F 3/14
(52) U.S. Cl. ............................ 62/304; 62/310; 261/91; 428/141
(58) Field of Search ........................... 62/114, 304, 310, 62/314, 315, 316; 261/91, 92, 95, 103, DIG. 3; 428/131, 134, 137, 141, 162, 172, 174, 182

(56) References Cited

U.S. PATENT DOCUMENTS

| 1,814,028 A | 7/1931 | Egli |
| 2,001,833 A | 5/1935 | Byrd |
| 3,200,051 A | 8/1965 | Silvern |
| 3,974,244 A | 8/1976 | Donachiue |
| 4,251,583 A | 2/1981 | Donachiue |

FOREIGN PATENT DOCUMENTS

| DE | 2362619 A1 | 6/1975 |
| DE | 8503340 U1 | 4/1986 |
| WO | WO99/01669 | 1/1999 |

*Primary Examiner*—Chen-Wen Jiang
(74) *Attorney, Agent, or Firm*—Hoffmann & Baron, LLP

(57) ABSTRACT

A method for evaporating liquid, in which a drum 1 in which there are passages 8 which extend across the thickness of the drum wall 3 is rotated in a trough 5 containing evaporation liquid 6, while a gas is fed from the drum 1 to the passages 8 is provided. As a result of the gas being passed through, the liquid which has been absorbed by the drum 1 evaporates, with the result that heat is extracted from the system of drum 1 and gas passed through. Depending on conditions, the method can be used to cool, for example flows of processed water or to cool air or to desalinate water. A device for carrying out the method and a drum which can be used in the device are also provided.

16 Claims, 4 Drawing Sheets

METHOD AND DEVICE FOR EVAPORATING A LIQUID AND CYLINDRICAL DRUM FOR USE IN THE DEVICE

CROSS-REFERENCE TO RELATED APPLICATIONS

This is a continuation application of PCT/NL00/00361 filed 25 May 2000, which PCT application claims priority from Dutch Application No. 1012173 filed 27 May 1999, both of which are incorporated herein by reference.

FIELD OF THE INVENTION

The invention relates firstly to a method for evaporating liquid, in which a hollow cylindrical drum, which is arranged in a housing and has a drum wall which comprise a liquid-absorbent material, is rotated about its cylinder axis which is arranged substantially horizontally, the drum being immersed in the liquid to be evaporated over part of its circumference, which liquid is situated in a trough which is arranged at the circumference of the drum, while a gas which takes up the evaporated liquid is conveyed in contact with the liquid-absorbent material.

BACKGROUND OF THE INVENTION

A method of this nature is described in DE-A-2 362 619.

The said publication describes a method of the type indicated above which is carried out in a device which operates in the manner indicated above and in which the drum comprises a liquid-absorbent wick-like material which can be moistened with a liquid, for example water, in order that, when air is passed through the wick material from the inside of the drum outwards, water can evaporate.

A method of this type has the drawback that, when water is taken up in the wick material, the pores become filled with water and the resistance to the flow of air increases rapidly.

Although the above publication states that, after it has been immersed in the water, the wick material is allowed to drip dry, it is nevertheless necessary to reckon with a considerable resistance to the flow of air.

SUMMARY OF THE INVENTION

The object of the present invention is to provide a device of the type described above which does not present a drawback of this nature.

To this end, the method according to the invention is characterized in that the liquid-absorbent material delimits a large number of passages which extend across the thickness of the drum wall and the gas is conveyed through these passages.

In the present context, passages is understood as meaning openings with a cross section of considerable size with respect to the liquid-absorbent material included in the drum wall, as will be explained in more detail below.

Advantageously, the passages will extend substantially radially with respect to the axis of the drum; however, this is not imperative, since passages which run in a direction other than the radial direction will also be satisfactory, provided that they are sufficiently large.

With regard to the direction of gas flow inside the passages extending across the thickness of the drum wall, it is, of course, possible to select flow from the inside outwards and from the outside inwards; it is an attractive option for the gas to be supplied inside the drum and to flow through the passages to the space outside the drum.

Where the above text has referred to liquid and gas which takes up evaporated liquid, it will be understood that the method as described offers the possibility of evaporating a wide variety of liquids using an equally wide variety of gases.

However, many applications will involve the evaporation of water, while it is obvious to use air as the gas which takes up evaporated water.

Water and air are generally available in copious quantities, and these two media will be in widespread use in particular for industrial purposes; however, the invention is not limited to these two media. If, instead of water, another liquid is to be evaporated, it will at any rate be necessary to ensure that the liquid-absorbent material is able to absorb this other liquid and that the liquid-absorbent material is inert to the said liquid, i.e. is not chemically affected by this liquid.

In a first embodiment of the method according to the invention, it is used to cool process water which is fed into the trough and air from the environment is conveyed through the passages, and during rotation of the drum at least some of the process water which is absorbed by the water-absorbent material is evaporated, and in this way the temperature of the process water which remains therein and/or of the liquid-absorbent material is reduced, with the result that, during further rotation, the temperature of the process water in the trough is reduced as a result of the cooled remaining absorbed process water and/or the cooled liquid-absorbent material coming into contact with the process water in the trough.

Process water is generated in very considerable quantities in industry and considerable work is involved in suitably cooling such quantities of process water. In many cases, cooling towers are used, in which water drips downwards through a filling packing and air is passed through in countercurrent, in order to cool the process water through evaporation of water.

Cooling processes of this nature require large-scale plant which, furthermore, has the drawback of forming aerosols which are entrained in the gas flow and may reach the environment, which is undesirable for certain environmentally polluting types of process water.

The method according to the invention as described above makes process water cooling of this nature easy and, to do so, uses a plant of small dimensions. In the method according to the invention, the formation of aerosols is to a large extent prevented since there is no contact between a flow of air and water which is already finely dispersed.

The water is absorbed at the surface of the absorption material and will evaporate from this position; consequently, there is little likelihood of aerosols being formed. This embodiment of the method according to the invention will be explained in more detail in the examples.

In another embodiment of the method according to the invention, it is used to cool air, in which method air is withdrawn from the environment and is fed through the passages, and the trough contains evaporation water which is absorbed by the liquid-absorbent material and at least part of which is evaporated during the rotation of the drum, with the result that the temperature of the remaining evaporation water and/or of the liquid-absorbent material is reduced, with the result that the temperature of the air which comes into contact therewith is reduced.

Particularly in houses and buildings, it is important, particularly when the outside temperature is high, for the temperature of the air inside the buildings to be reduced to an acceptable level while, at the same time, providing sufficient ventilation. If the air is simply cooled and dehumidified, the inside climate becomes unpleasant, leading to what is known as sick building syndrome. This is because of the fact that, for economic reasons, the cooled air is reused, with the result that insufficient fresh air is supplied. The cooling efficiency of a good air conditioning installation—the COP—is 5. This means for each kW of electric power supply 5 kW of cooling energy is obtained.

Using the invention, outside air is cooled by the evaporation of water. The COP is in this case 75. The cooling energy is obtained by the evaporation of water. Since in this method the economic reason is virtually eliminated, it is possible to cool sufficient fresh air and to ensure that the inside climate remains cool and pleasant.

As will be explained in more detail below, by using the method according to the invention in which water is evaporated and therefore heat is extracted, it is possible to achieve very substantial cooling of air which is to be fed to a working environment while, at the same time, the humidity levels in the cooled air remain at an acceptable level. In the conventional air conditioning units of the type which have a closed evaporation/cooling system, it is often the case that not only is the air cooled, but also there is a considerable reduction in humidity, with the result that the condition of the air is uncomfortable for people working in this environment.

In another embodiment of the method according to the invention, it is used for desalination of water, in which method air is withdrawn from the environment and is fed through the passages, and the trough contains salt-containing water which is absorbed by the water-absorbent material and at least some of which is evaporated during the rotation of the drum about its cylinder axis, leaving behind salt and/or water which is further enriched with salt, while the water which has been taken up in the air in this way is recovered by condensation in a subsequent step, and heat and salt-containing water are added continuously in amounts corresponding to the amount of water which has been evaporated.

In this method, the absorbent material which is active in the method takes up salt-containing water, some of the water is evaporated, leaving behind salt or water with increased concentrations of salt, and then the water is recovered by condensation from the air flow which has been enriched with water vapour in this way.

In a highly attractive embodiment of the method for desalination of water outlined above, the condensation step which is present is carried out by using a separate cylindrical drum which comprises a water-absorbent material and which is rotated about its cylinder axis which is substantially horizontally oriented and part of the circumference of which is immersed in salt-free water which is situated in a separate trough and is at a temperature which is lower than the temperature of the water to be desalinated, the drum and the trough for the water to be desalinated and the drum and the trough for the salt-free water being accommodated in one chamber, while heat and water are extracted from the trough containing salt-free water continuously in amounts corresponding to the amount of water vapour which is condensed.

By selecting a lower temperature of the salt-free water than the temperature of the salt-containing water, it is possible to ensure that the water vapour pressure on the surface of the liquid-absorbent material on the salt-free water side of the installation is lower than on the salt-containing water side. Consequently, there is a driving force which causes water vapour to condense on the water-absorption material which is included by the drum rotating in a trough containing salt-free water.

In the attractive embodiment outlined above, it is ensured that the salt-free water is constantly at least 5° C. lower than the temperature of the water to be desalinated.

By making a drum comprising water-absorbent material rotate through water which is to be desalinated and also making a drum comprising water-absorbent material rotate in a trough containing salt-free water, with both drums and troughs situated in the same chamber and with the water to be desalinated being at a higher temperature than the salt-free water, it is possible, under the conditions indicated, to obtain a simple, inexpensive desalination method which has a very beneficial effect on the cost price of salt-free water.

Where the above text has referred to desalination, a term which assumes the presence of salt, it should be understood that the method may, of course, also be used to obtain pure water from solutions which additionally or exclusively contain dissolved substances other than salt. The method can be used in situations in which the dissolved substance does not have any substantial volatility of its own.

In this context, it is also possible to mention the possibility of obtaining pure water from flows of sewage water; obviously, a process of this type must be surrounded by measures for disinfecting the contaminated water and/or the water obtained.

The word salt, incidentally, is understood as meaning not only NaCl but also the other dissolved minerals which are present in sea water.

The invention also relates to a device for evaporating liquid, at least comprising a housing in which there is a hollow cylindrical drum with a drum wall which comprises a liquid-absorbent material and which can rotate about its cylinder axis, which is substantially horizontally oriented, having a trough for liquid which is to be evaporated arranged at the circumference of the drum and means for conveying, in contact with the liquid-absorbent material, a gas which takes up the evaporated liquid, which is characterized in that the liquid-absorbent material comprises a corrugated liquid-absorbent material, an elongate strip of which, the longitudinal direction of which strip forms an angle with the corrugations of the corrugated liquid-absorbent material, is wound helically so as to form the hollow cylindrical drum, and the drum wall substantially consisting of liquid-absorbent material, the drum comprising passages which extend across the thickness of the drum wall, which are delimited by absorbent material and through which gas can be conveyed.

As indicated above, the passages will expediently extend substantially radially with respect to the axis of the drum: the angle between the longitudinal direction of the strip and the corrugations is then approximately 90°.

In an attractive embodiment of the device, the corrugated liquid-absorbent material is combined with a flat liquid-absorbent material to form a composite liquid-absorbent material. A material of this nature which is flat on one side, when wound helically to form a hollow cylindrical drum, will not exhibit any problems relating to the corrugations of the strip of material used which lie on top of one another becoming interlocked. Moreover, the presence of the flat liquid-absorbent material increases the active surface area of the drum still further, which is advantageous.

The liquid-absorbent material which is used in the invention may, of course, be any liquid-absorbent material which has a high liquid-absorption capacity at its surface and is expediently of board- or sheet-like nature; it is preferable to use a liquid-absorbent material which comprises a core of plastic material which is coated on two sides with an adhering plastic nonwoven material. By using a material of this nature, an advantageous uptake of liquid is obtained in the nonwoven coatings which adhere to the plastics material core, the liquid, such as for example water, being distributed in a uniform thin layer over the surface of the liquid-absorption material, and overall good wetting of the liquid-absorption material being obtained.

In a highly attractive embodiment, the core of the liquid-absorption material consists of polystyrene, and the plastic of the coating comprises polyester. A liquid-absorption material of this nature exhibits relatively little chemical interaction with a liquid, such as for example water; this means therefore that the water is substantially mechanically anchored. The material is highly advantageous since it has a relatively good chemical resistance, so that a drum fitted with material of this nature can be cleaned using moderate chemical agents.

The invention also relates to a cylindrical drum having a drum wall which comprises a liquid-absorbent material for use in a device as described above according to the invention, which is characterized in that the liquid-absorbent material comprises a corrugated liquid-absorbent material, an elongate strip of which, the longitudinal direction of which strip forms an angle with the corrugations of the corrugated absorbent material, is wound helically so as to form the cylindrical drum, the drum comprising passages which extend across the thickness of the drum wall and are delimited by absorbent material.

As described above, in an advantageous embodiment the corrugated liquid-absorbent material is combined with a flat liquid-absorbent material to form a composite material; the passages which are present in the drum will preferably extend substantially radially with respect to the axis of the cylindrical drum.

BRIEF DESCRIPTION OF THE DRAWINGS

The invention will now be described with reference to the drawing, in which.

DETAILED DESCRIPTION OF THE INVENTION

Figure 1:
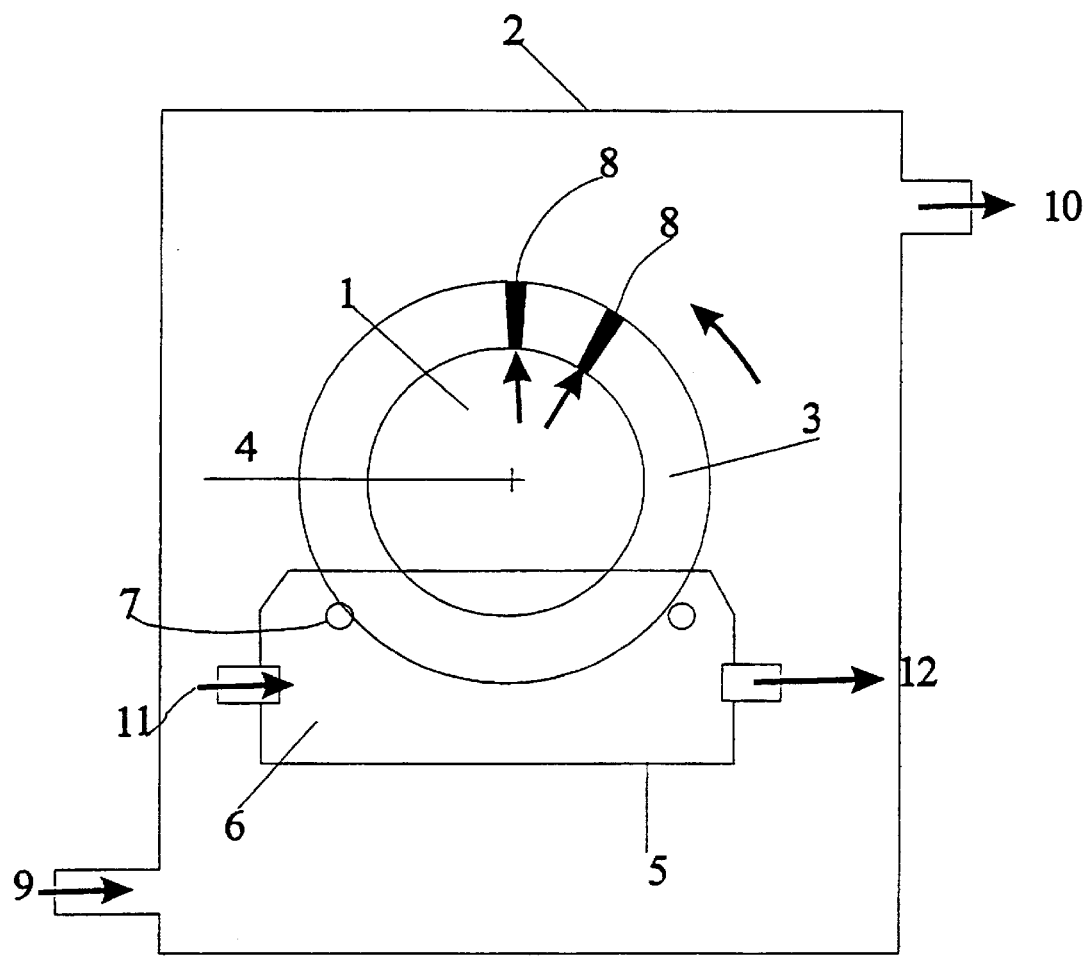
FIG. 1 diagrammatically depicts a device which embodies a method for the evaporation of liquid.

FIG. 1 shows a device which embodies the method according to the invention. The device comprises a hollow cylindrical drum 1 with a drum wall 3 which can rotate about a cylinder axis 4. Over part of its circumference, the drum 1 rotates in a trough 5 which is filled with liquid 6 which is to be evaporated. As shown in the figure, the drum 1 rests on driven rollers 7, with the result that the drum 1 can rotate. Obviously, the drum may also be provided with shaft means which are positioned by means of spokes.

Two passages which extend from the inside of the drum 1 to the outside are diagrammatically indicated by 8; gas, for example air, which is fed in at 9 is introduced into the drum 1 with the aid of a fan, leaves the drum via the passages 8 and exits the housing 2 at 10.

Because the drum 1 rotates in the trough 5 containing liquid 6, for example water, the liquid-absorbent material which delimits the passages 8 is given the opportunity to take up water, and during further rotation, as a result of the air flowing through the passages, evaporation will occur, with the result that the temperature of the water which remains in the liquid-absorption material and/or the liquid-absorbent material itself will fall due to the extraction of heat of evaporation, resulting in a fall in temperature of the liquid or the material.

When process water is fed to the trough 5, gradual cooling of the process water will occur, depending, obviously, on the active surface area of the drum, the amount of process water supplied, the temperature of the process water and the quantity and condition of the air fed through the passages 8.

If the object of the installation is to cool air, cooling of the air which is passed through the passages 8 will occur, once again as a function of the abovementioned variables, with a simultaneous change in the atmospheric humidity of this air, which will generally be increased.

Figure 2:
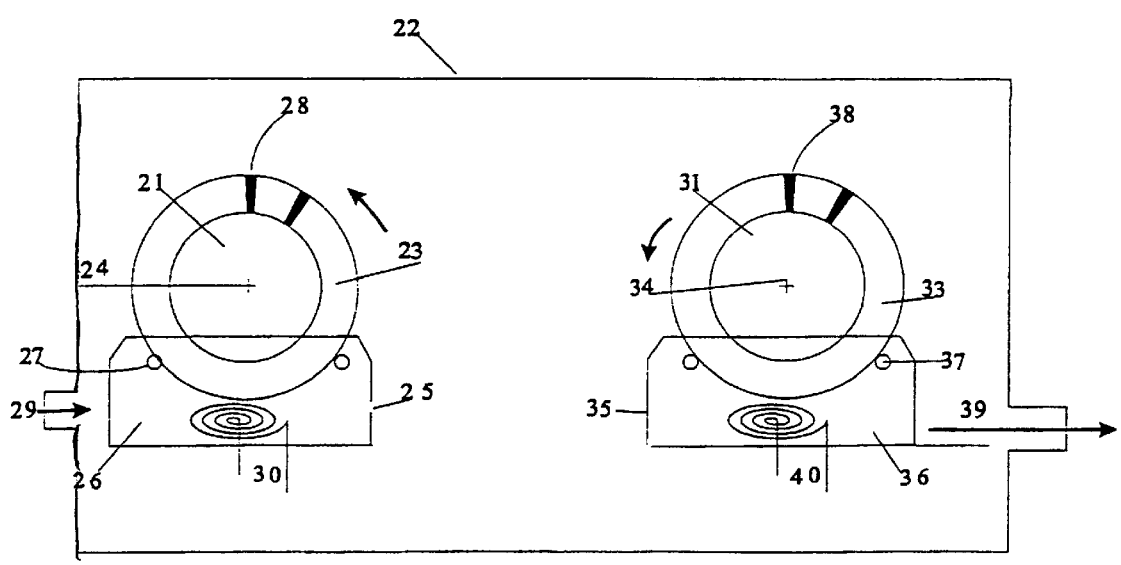
FIG. 2 diagrammatically depicts a device for the desalination of water.

FIG. 2 diagrammatically depicts a device for the desalination of water, in which two devices are positioned inside one chamber 22, embodying the method according to the invention. In this arrangement, the left-hand installation is intended for the evaporation of water from salt water, while the right-hand device is intended for extracting water from the water-enriched air by condensation.

In the left-hand device, a drum 21 with a drum wall 23 rotates about an axis 24. The drum rotates in a trough 25 which contains salt water 26; the drum rotates on rollers 27 and is driven thereby. The drum comprises passages 28 which delimit the water-absorbent material present; air from the chamber 22 is fed into the drum 21 and leaves the drum via the passages 28. Since the drum rotates through the trough 25 containing salt water 26, the liquid-absorbent material takes up salt water; the air flowing through the passages 28 causes the water to evaporate, while water which is further enriched with salt remains behind; suitably setting the rotational speed and air velocity prevents salt from crystallizing out in the liquid-absorbent material when water evaporates. To top up the amount of evaporated water, additional salt water is supplied at 29; 30 indicates the point where the water in the trough is held at a specific fixed temperature with the aid of a heating coil and a control device (not shown).

Obviously, if, for example, there is sufficient sea water at a relatively high temperature, it is possible to dispense with the use of a heating coil. A situation of this nature may arise in tropical areas.

The right-hand installation comprises, in the same way, a drum 31 with a drum wall 33 which rotates about an axis 34. Over part of its circumference, the drum is immersed in salt-free water 36 which is situated in a trough 35; the drum rotates on and is driven by rollers 37.

Air is sucked in from the chamber 22 by a fan, is blown into the drum 31 and leaves the drum via the passages 38. By means of a cooling coil, the content 36 of the trough 35 is kept at a temperature which is below the temperature of the content 26 of the trough 25; by way of example, a minimum temperature difference of 5° C. is maintained. Since the drum 31 is rotating in water 36 which is at a lower temperature than the water 26 in the left-hand device, when air is passed through the passages 38 water will condense until the air has a water vapour pressure which is equal to the water vapour pressure associated with the temperature of the water 36 which is situated in the trough 35 and on the drum 31. Therefore, heat of condensation is liberated; due to the presence of the cooling coil 40, this heat of condensation is ultimately dissipated. The excess water which enters the trough 35 as a result of the condensation process is discharged continuously at 39. In steady-state operation, the flows 29 of salt water and 39 of salt-free water will be approximately equal to one another.

Figure 3:
FIG. 3 diagrammatically depicts a corrugated liquid-absorbent material.

FIG. 3 diagrammatically depicts a liquid-absorbent material, such as a water-absorbent material 41, which in this case has undergone deformation into the shape of a trapezium. Obviously, the shape is not limited to this shape; sinusoidal or other shapes will also provide suitable results.

Figure 4:
FIG. 4 provides a suitable illustration of a corrugated liquid-absorbent material which is combined with a flat liquid-absorbent material.

FIG. 4 shows how a trapezium-like corrugated material 51 is joined to a flat liquid-absorbent material 52 so as to form a composite liquid-absorbent material.

The liquid-absorbent material typically has a thickness of between 50 and 250 μm and a total thickness across parts 51 and 52 of 5–20 mm, in particular 5–15 mm, and more particularly 10 mm. The passages which are formed in the latter embodiment as a result of layers being wound on top of one another have a height, with respect to the base 52, of approximately 8 mm and are trapezium-shaped, with a base width of ±20 mm and a top surface width of ±5 mm.

The total open surface area, as seen in the direction of the passages, of the drum wall may be from 50–80% or more.

Figure 5:
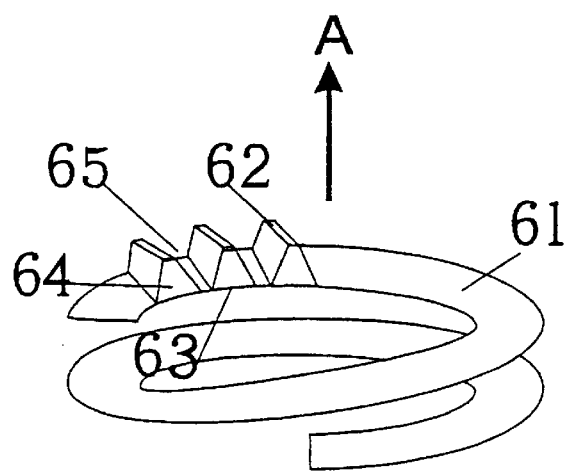
FIG. 5 provides a very diagrammatic illustration of the way in which a strip of composite liquid-absorbent material is wound helically in order to produce a hollow cylindrical drum which can be used in the invention.

FIG. 5 provides a highly diagrammatic illustration of how a drum can be formed from a strip of liquid-absorbent material by winding into a coil. A strip of material 61 which, as diagrammatically illustrated, is composed of a flat liquid-absorbent material 63 and a corrugated liquid-absorbent material 62 is wound helically about an axis (not shown) so as to form a hollow cylindrical drum. For the sake of clarity, the coil is shown in exploded form which is obtained by pulling in the directions A and B; in the position of use, the peaks of the corrugated material 62 will bear against the underside of the flat liquid-absorbent material 63, forming passages 64 and 65.

The drum (also referred to as a rotor) is typically composed of strips of liquid-absorbent material with a width of, for example, 100 mm.

When a strip of the type shown in FIG. 4 is used, a pitch of, for example, 10–15 mm is obtained; typically of approximately 10 mm.

In the above text, where there is mention of a composite liquid-absorbent material, it is always stated that the composite material is composed of two parts. Obviously, options are not limited to this particular arrangement; it is also possible for a flat liquid-absorbent material to be present on both sides of the corrugated material, while it is also conceivable for the entire liquid-absorbent material to be produced in a single process step.

EXAMPLES

The invention will now be explained in more detail with reference to a number of working examples.

Example I

Use of the Method for Cooling Process Water

To carry out this method, use is made, for example, of a device as shown in FIG. 1. The evaporation air is passed through the passages 8 at a velocity of 1 to 2 m/s; the ambient air may be at a temperature of between 15 and 35° C.

The following empirical formula which has been worked out by the inventor applies to the heat-transfer phenomena in the device:

$$Q = k \times * r * A * \Delta P_D$$

where

Q is the heat flow in kcal/m²/h;

k is a heat transfer constant which has been determined by the inventor and which under the conditions of the test has a value of 150 (this value is a good approximation for the range of air velocity and air temperature indicated above);

r is the heat of evaporation of water in kcal/kg; this value is 540 kcal/kg;

A is the contact surface area on the drum, which for calculation purposes is set at 1 m²; and $\Delta P_D$ is equal to the difference in water vapour pressure of the inlet air and the mean water vapour pressure of the water on the drum in kg/cm².

When, in FIG. 1, a specific point on the drum leaves the liquid surface, the evaporation of (warm) process water begins, since the saturated vapour pressure associated with the temperature of the process water is higher than the saturated vapour pressure of water at the temperature of the surrounding air. When the drum rotates in the anticlockwise direction, the said point will move back into the process water after approximately ¾ of a revolution. Working on the basis of the following assumptions, we can then make a calculation.

Assumptions:

The inlet air has a dry bulb temperature of 28° C. (saturated vapour pressure 0.0385 kg/cm²) and a wet bulb temperature of 22° C. The inlet air has a relative humidity of 68%, the water vapour pressure therein is therefore 0.68*0.0385=0.0261 kg/cm². The cooling water temperature on entry into the trough and on absorption is 30° C.

Due to evaporation, the absorbed water can cool down to 22° C. (the wet bulb temperature of the inlet air). The example relates to an installation which in one revolution cools the water which has been absorbed at the drum from 30 to 22° C. The temperature of the water on the drum on returning to the trough is therefore 22° C.

The mean water temperature in the trough will over time be (30+22)/2=26° C., with an associated saturated water vapour pressure of 0.0343 kg/cm².

The film of water on the contact surface is approximately 300 micrometres thick, i.e., has a weight of 0.3 kg/M² contact surface area.

If the temperature of the water on the rotor falls from 30–22=8° C. during one revolution, it must therefore be the case that 8*0.3=2.4 kcal/m² has been dissipated per revolution.

The formula given above can now be filled in using the following parameters:

r=540 kcal/kg;

A=1 m²; k=150; and $\Delta P_D$=0.0343–0.0261=0.0082 kg/cm².

When these values are filled in, Q=150*540 ×1*0.0082= 664.2 kcal/m²/h=0.1845 kcal/m²/sec.

Then, in order to dissipate 2.4 kcal/m²/revolution of heat, it is therefore necessary for there to be an exposure time to air of 2.4/0.1845 sec available per revolution, i.e., an exposure time of 13.0 sec.

Since the drum is partially immersed in the water, over ±¼ of the circumference, the time per revolution of the total drum has to be set at ⁴⁄₃*13.0=17.3 sec.

The number of revolutions per minute will therefore be 60/17.3=3.5.

The total amount of heat which 1 m² of contact material on the rotor can transfer in 1 h is, at the said speed, 60*3.5*2.4=499 kcal, i.e., 499 kcal/m²/h.

As stated above, the rotor may advantageously be composed of corrugated material which is combined with a flat absorption material. In a typical example of a material of this nature, 1 m² on the outer surface of the drum 66 comprises corrugated strips each with a length of 1 m and a width of 0.1 m which are positioned on top of one another. A section of the drum of this size typically has a total contact surface area of 32 m² (i.e., 1 m² of drum outer surface area corresponds to 32 m² of contact surface area).

In a practical application, for example, a flow of process water from which 500 kW of heat is to be dissipated is formed.

500 kW corresponds to 430,000 kcal/h and, as stated above, the dissipation capacity of 1 m² of contact surface area of the drum is 499 kcal/h.

To dissipate the abovementioned 430,000 kcal/h, 430,000/499=862 m² contact surface area is therefore required.

Since 1 m² outer surface area of the drum corresponds to 32 m² active contact surface area, the outer surface area of the drum therefore has to be 862/32=26.9 m².

For a typical rotor diameter of 1.8 m, we can then calculate the length L as follows:

$$26.9 = \pi * 1.8 * L \text{ drum, } L \text{ drum}=4.76 \text{ m.}$$

Therefore, to dissipate 500 kW, a drum with a diameter of 1.8 m and a length of 4.76 m is sufficient.

Obviously, depending on the conditions, it is also possible to employ a plurality of devices of the type described in FIG. 1 in order to dissipate the desired amount of heat. The latter option will apply, for example, if the amount of heat is considerably greater than that given above. On the other hand, it is also possible to select different dimensions of the same device if the amount of heat is significantly less.

Example II

Figure 6:
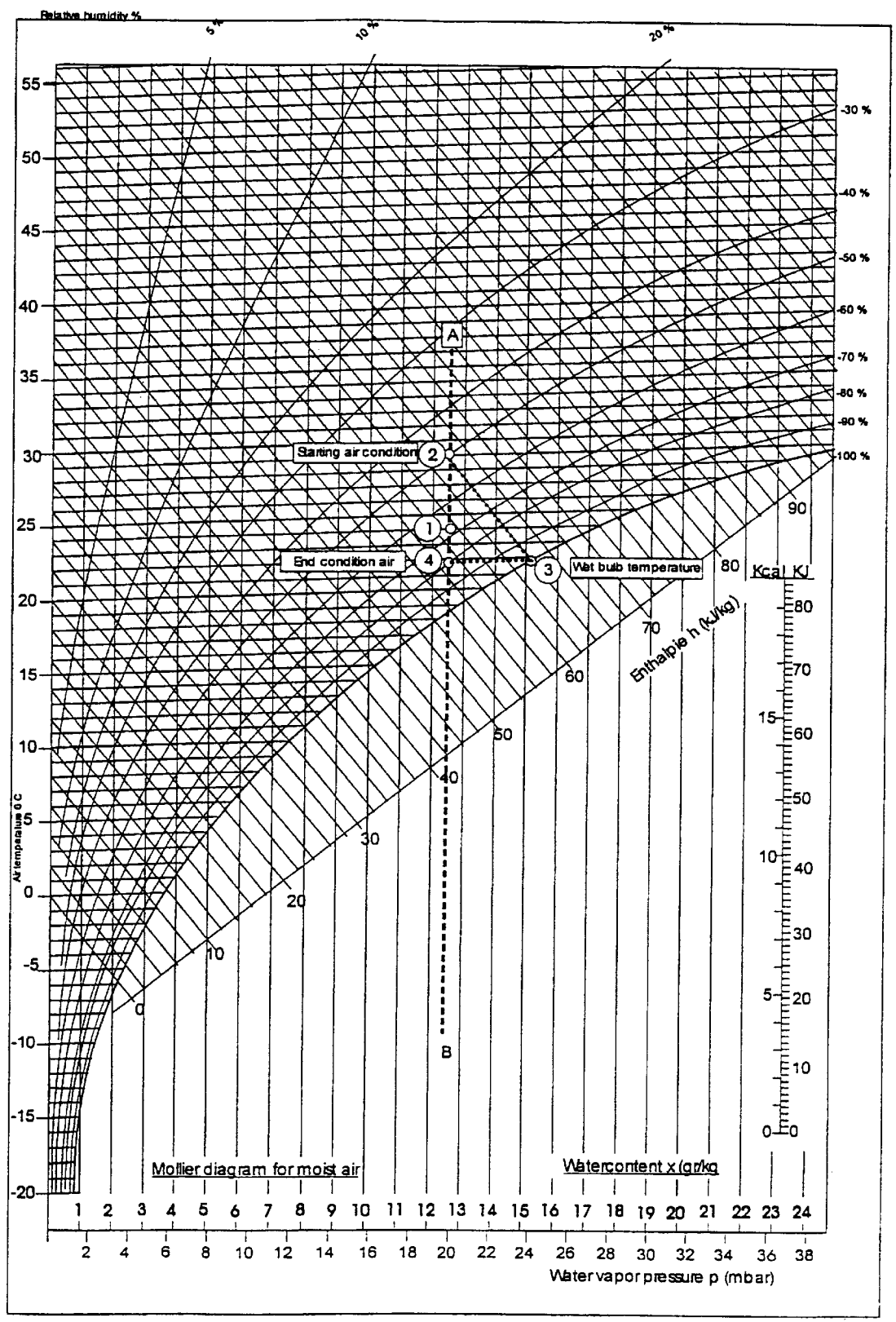
FIG. 6 shows a Mollier diagram which is discussed in one of the examples.

Air cooling (cf. FIG. 6).

The situation in Tangier in Morocco is used as the basis for the calculations.

Climatic data:

Mean 24-hour temperature 23.9° C.;

Water vapour pressure 0.0304 kg/cm²;

Mean maximum temperature 28.3° C.;

Mean relative humidity 68%; and

Desired air flow rate 15,000 m³/h.

With a mean relative humidity of 68%, the mean water vapour pressure will be 0.68*0.0304=0.0207 kg/cm².

Starting from point 1 in the Mollier diagram (23.9° C.; 68% relative humidity) in FIG. 6, a vertical line is drawn using a dashed line running between A and B.

Air at the highest temperature (28.3° C.; point 2) is cooled adiabatically in a device according to the invention, and during the said adiabatic cooling, point 3 will be reached, with the temperature of the air falling to the wet bulb temperature, i.e, the temperature at which the air is saturated or virtually saturated with water vapour. At point 3, the temperature has fallen to 21° C. while, as can be seen from the diagram, the water vapour pressure has increased to 0.0253 kg/cm².

The air is then blown into the chamber which is in communication with the outside air, with the result that the water vapour pressure falls to 0.0204 kg/cm², corresponding to the abovementioned mean water vapour pressure (point 4). It can be seen that this air is at a temperature of 21° C. and a relative humidity of 80%.

As a result of using the device according to the invention, of which FIG. 1 is an example, with air flows 9 and 10, where 9 represents the air supplied and 10 represents the air released, at a temperature of 21° C. and a relative humidity of 80%, the result will be considerable cooling, while the humidity of the air ends up at a level which is suitable for humans to feel comfortable.

Obviously, in the device shown in FIG. 1, in this case water will have to be fed continuously to the trough 5 in order to compensate for the amount of water which is evaporated in the drum 3 with the passages 8.

To provide an illustration of an installation which is required for this process, the following considerations apply. At point 3 in the Mollier diagram, the enthalpy is 16.1 kcal/kg. At point 4, the enthalpy is 13.5 kcal/kg.

Therefore, at a desired air flow rate of 15,000 m³/h, 15,000*1.2*(16.1–13.5)=46,800 kcal of heat is dissipated (air density=1.2 kg/m³).

As stated in the previous example, the heat flow is given by the following approximate formula:

$$Q = k * r * A * \Delta P_D$$

where k is a constant which, under the usual conditions under which this installation operates, is 150;

r is the heat of evaporation 540 kcal/kg;

A is the outer surface area of the drum, which in this case is set at 1 m²; and $\Delta P_D$ is the difference in water vapour pressure in kg/cm², which in this case is 0.0049 kg/cm² (vapour pressure at point 3 —vapour pressure at point 4).

Q is in this case 397 kcal/m²/h.

In total, 46,800 kcal/h are dissipated, which therefore requires 46,800/397=118 m² contact surface area.

Working on the basis of the calculation carried out above, wherein 1 m² of outer surface area of the drum corresponds to a contact surface area of 32 m², a drum surface area of 3.68 m² is therefore required for 118 m² of contact surface area.

For a typical drum diameter of 1.2 m, this therefore means a drum with a length of 0.98 m.

The desired air flow rate is 15,000 m/h, i.e. 4.16 m³/sec.

The rotor outlined above typically has an open surface area of 2.25 m²; the air velocity through the rotor is then 4.16/2.25=1.8 m/sec. If desired, the velocity can be reduced by selecting larger dimensions for the drum.

Under full load, it is necessary to dissipate 46,800 kcal of heat per hour, corresponding to 46,800/540=86 kg/h of water which is evaporated in the device according to the invention. If necessary, additional water has to be supplied to the trough in order to keep the salt and lime contents and other impurities within acceptable levels, so that precipitation of these constituents on the water-absorbent material is prevented. Obviously, sea water can also be used for the cooling process; this water has to be partially drained in order to prevent a build-up of salt. Drain water may, for example, be used as water for flushing toilets.

III. Desalination (cf. FIG. 2)

In the figure, two rotors are arranged in a common housing. One rotor is designed as an evaporator and turns in sea water which is held at a constant temperature of 40° C. by an external source. The second rotor is the condenser rotor. This turns through distilled water which is held at 20° C. by an external source. The vapour pressure of the water vapour on the condenser rotor is 0.0238 kg/cm². The vapour pressure of the water vapour on the evaporator. rotor is 0.0752 kg/cm². If we assume that both rotors have the same active surface area, the vapour pressure in the chamber will be equal to half the sum of the separate water vapour pressures, i.e. (0.0238+0.0752)/2=0.0495 kg/cm². If we keep the heat transfer coefficient as 150, an amount of water which corresponds to Q=1*540*150*0.0257=2081 kcal/m² of contact surface area will evaporate from the evaporator rotor per m² of evaporator surface area, which has a water vapour pressure difference compared to the chamber of 0.0752–0.0495=0.0257 kg/cm². The evaporation of 1 kg of water requires 540 kcal; the amount of water evaporated is therefore 2081/540=3.85 kg/h. In the equilibrium state, the same amount of water per hour will condense on the condenser rotor.

What is claimed is:

1. Method for evaporating liquid, in which a hollow cylindrical drum (1), which is arranged in a housing (2) and has a drum wall (3) which comprise a liquid-absorbent material, is rotated about its cylinder axis (4) which is arranged substantially horizontally, the drum (1) being immersed in the liquid (6) to be evaporated over part of its circumference, which liquid is situated in a trough (5) which is arranged at the circumference of the drum (1), while a gas which takes up the evaporated liquid (6) is conveyed in contact with the liquid-absorbent material, wherein the liquid-absorbent material delimits a large number of passages (8) which extend across the thickness of the drum wall (3) and the gas is conveyed through these passages (8).

2. Method according to claim 1, wherein the passages (8) extend substantially radially with respect to the axis (4) of the drum (1).

3. Method according to claim 1, wherein the gas (9) is supplied inside the drum (1) and flows through the passages (8) to the space outside the drum (1).

4. Method according to claim 1, wherein it is used to cool process water (11) which is fed into the trough (5) and air (9) from the environment is conveyed through the passages (8), and during rotation of the drum (1) at least some of the process water (11) which is absorbed by the water-absorbent material is evaporated, and in this way the temperature of the process water (11) which remains therein and/or of the liquid-absorbent material is reduced, with the result that, during further rotation, the temperature of the process water (11) in the trough (5) is reduced as a result of the cooled remaining absorbed process water (11) and/or the cooled liquid-absorbent material coming into contact with the process water (11) in the trough (5).

5. Method according to claim 1, wherein it is used to cool air (9), in which method air (9) is withdrawn from the environment and is fed through the passages (8), and the trough (5) contains evaporation water (6) which is absorbed by the liquid-absorbent material and at least part of which is evaporated during the rotation of the drum (1), with the result that the temperature of the remaining evaporation water (6) and/or of the liquid-absorbent material is reduced, with the result that the temperature of the air (9) which comes into contact therewith is reduced.

6. Method according to claim 1, wherein it is used for desalination of water, in which method air is withdrawn from the environment and is fed through the passages (28), and the trough (25) contains salt-containing water (29) which is absorbed by the water-absorbent material and at least some of which is evaporated during the rotation of the drum (21) about its cylinder axis (24), leaving behind salt and/or water which is further enriched with salt, while the water which has been taken up in the air in this way is recovered by condensation in a subsequent step, and heat (3) and salt-containing water (29) are added continuously in amounts corresponding to the amount of water (29) which has been evaporated.

7. Method according to claim 6, wherein the condensation step is carried out by using a separate cylindrical drum (33) which comprises a water-absorbent material and which is rotated about its cylinder axis (34) which is substantially horizontally oriented and part of the circumference of which is immersed in salt-free water (36) which is situated in a separate trough (35) and is at a temperature which is lower than the temperature of the water (25) to be desalinated, the drum (23) and the trough (25) for the water (29) to be desalinated and the drum (33) and the trough (35) for the salt-free water (36) being accommodated in one chamber (22), while heat (40) and water (39) are extracted from the trough (35) containing salt-free water (36) continuously in amounts corresponding to the amount of water vapour which is condensed.

8. Method according to claim 7, wherein the temperature of the salt-free water (36) is at least 5° C. lower than the temperature of the water (26) to be desalinated.

9. Device for evaporating liquid, at least comprising a housing in which there is a hollow cylindrical drum with a drum wall which comprises a liquid-absorbent material and which can rotate about its cylinder axis, which is substantially horizontally oriented, having a trough for liquid which is to be evaporated arranged at the circumference of the drum and means for conveying, in contact with the liquid-absorbent material, a gas which takes up the evaporated liquid, wherein the liquid-absorbent material comprises a corrugated liquid-absorbent material (41), an elongate strip of which, the longitudinal direction of which strip forms an angle with the corrugations of the corrugated liquid-absorbent material, is wound helically so as to form the hollow cylindrical drum, and the drum wall substantially consisting of liquid-absorbent material, the drum comprising passages which extend across the thickness of the drum wall, which are delimited by absorbent material and through which gas can be conveyed.

10. Device according to claim 9, wherein the passages extend substantially radially with respect to the axis of the drum.

11. Device according to claim 9, wherein the corrugated liquid-absorbent material (51) is combined with a flat liquid-absorbent material (52) to form a composite liquid-absorbent material.

12. Device according to claim 9, wherein the corrugated liquid-absorbent material and/or the flat absorbent material comprise a core of plastic material which is coated on two sides with adhering plastic nonwoven material.

13. Device according to claim 12, wherein the core of plastic material comprises polystyrene, and the plastic of the coating comprises polyester.

14. Cylindrical drum having a drum wall which comprises a liquid-absorbent material, for use in a device according to claim 9, the liquid-absorbent material comprises a corrugated liquid-absorbent material (61), an elongate strip of which, the longitudinal direction of which strip forms an angle with the corrugations (62) of the corrugated absorbent material, is wound helically so as to form the cylindrical drum, the drum comprising passages (64, 65) which extend across the thickness of the drum wall and are delimited by absorbent material.

15. Cylindrical drum according to claim 14, wherein the corrugated liquid-absorbent material is combined with a flat liquid-absorbent material to form a composite material.

16. Cylindrical drum according to claim 14, wherein the passages (64, 65) extend substantially radially with respect to the axis of the cylindrical drum.

* * * * *